United States Patent [19]

Buchan et al.

[11] 4,184,833
[45] Jan. 22, 1980

[54] PELLETIZING APPARATUS

[75] Inventors: Walter Buchan, Norton; Gomer E. Kropa, North Reading, both of Mass.; Edward J. Winiarski, Pawtucket, R.I.

[73] Assignee: Leesona Corporation, Warwick, R.I.

[21] Appl. No.: 845,413

[22] Filed: Oct. 25, 1977

[51] Int. Cl.² ............................................. B29C 17/14
[52] U.S. Cl. ................................... 425/311; 425/313; 264/142
[58] Field of Search ....................... 425/310, 311, 313; 264/142; 74/10.52

[56] References Cited

U.S. PATENT DOCUMENTS

| | | | |
|---|---|---|---|
| 1,653,807 | 12/1927 | Knox | 425/310 |
| 1,744,330 | 1/1930 | Mull | 74/10.52 |
| 2,075,450 | 3/1937 | Meakin | 425/311 X |
| 2,914,953 | 12/1959 | Tyzack | 74/10.52 |
| 3,230,582 | 1/1966 | Hoffman et al. | 425/311 X |
| 3,337,913 | 8/1967 | List | 425/313 X |
| 3,353,213 | 11/1967 | Niemeyer | 425/313 X |
| 3,564,650 | 2/1971 | Irving | 425/310 X |
| 3,685,751 | 8/1972 | Anders | 425/311 X |
| 4,099,900 | 7/1978 | Bradbury et al. | 425/313 |

*Primary Examiner*—Robert L. Spicer, Jr.
*Attorney, Agent, or Firm*—Robert J. Doherty

[57] ABSTRACT

A knife adjustment system including a normally non-rotatable quill threadably attached to a hub outwardly extending from the face of an extrusion die at a point proximal said face in order to insure that the operating temperatures of such quill and hub at the connection location are generally equal. Adjustment means for threadably rotating the quill with respect to the hub so as to in turn adjust the spacing of cutter knives with regard to the die face in the form of a planetary gear system located at that end of the hub distal from the die face is further included. The knives are fixed to a knife carrier and in turn supported for rotation about the quill.

7 Claims, 4 Drawing Figures

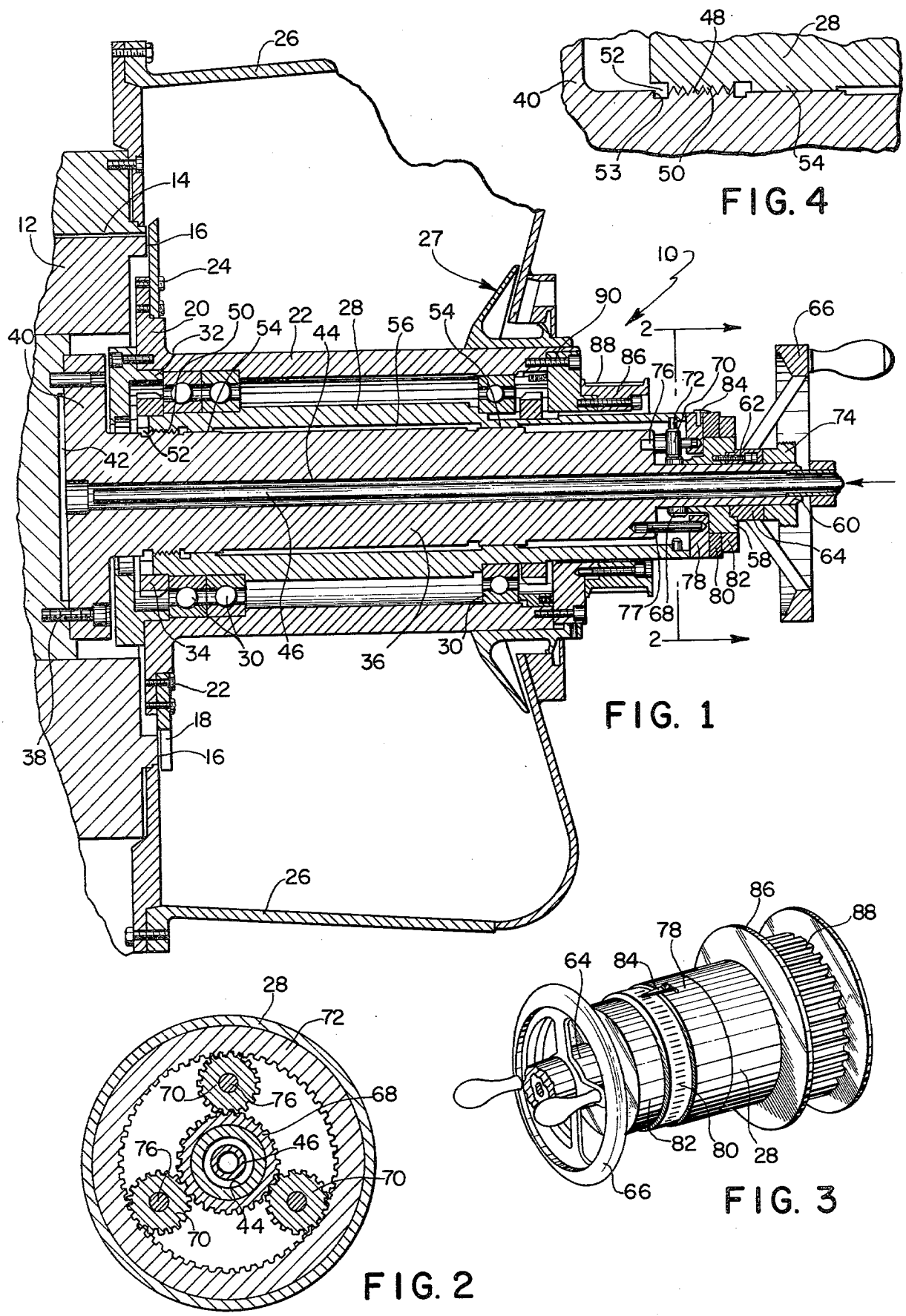

PELLETIZING APPARATUS

BACKGROUND OF THE INVENTION

This invention relates to knife adjustment means and particularly such a construction utilized in combination with means for forming thermoplastic pellets wherein strands of thermoplastic material are extruded into an enclosed chamber whereupon they are cut into discrete particles or pellets by rotating knives. The invention is particularly directed to a novel adjustment mechanism for moving the knives towards and away from the face of the die in such a manner that the desired gap therebetween is substantially unaffected by temperature changes within the knife supporting structure.

Pelletizing apparatus including those having knife adjustment systems of this general type are known and include that shown in U.S. Application Ser. No. 748,235 filed Dec. 6, 1976, now U.S. Pat. No. 4,099,900, directed to a novel pellet cooling system and assigned to the assignee of the present invention. Such adjustment system and those systems similar thereto generally move that portion of the apparatus upon which the knives are supported freely towards and away from the normally heated face of the extrusion die from some adjustment point conveniently remote therefrom. Accordingly, when such adjustment is initially made as upon startup of the machine, heat buildup at those portions of the knife supporting structure proximal to the face of the heated die may expand at a different rate than portions thereof located more remote from the heat source and subsequently cause changes in the knife gap or spacing. Generally this change of spacing is away from the die face and requires an inward adjustment during operation which can as upon cooling during shut off cause a knife shift against the die and scoring of the die face upon a subsequent start up. Such mechanisms also require readjustment during operation.

Accordingly, it is a primary object of the present invention to provide a novel adjustment mechanism for an extrusion apparatus of the aforementioned type in which relative heat changes in the various areas thereof does not adversely affect the knife adjustment setting.

A further object of the present invention is the incorporation into such equipment of a novel knife adjustment mechanism such that adjustment thereof may take place at a convenient location distal from the operating extrusion die face and in such a manner that rotational operator adjustment movement is translated to similar movement relative to the die face.

A still further object of the present invention is the provision of a knife support and adjustment means wherein such is assembled with the extrusion die at a point proximate the heated face thereof whereby expansion movements between the die and knife support are equalized.

SUMMARY OF THE INVENTION

The above objects are substantially met by the provision of an apparatus for cutting material strands as they emerge from a melt extruder having a plurality of extrusion openings generally radially extending about the face thereof. The extruder further includes a stationary cylindrical hub outwardly extending from said face. Thereon a hollow generally stationary quill is positioned over and attached to the hub at a location proximal to the extruder face by means of a mutual thread engagement. A knife carrier is rotatably supported on the quill, said knife carrier having at least one knife mounted thereon and adapted for opposed positioning with respect to said extruder face and in the path of said openings so as to cut material as it emerges therefrom upon rotation about said quill. Quill adjusting means are positioned at that end of the hub distal from said extruder face for threadably rotating said quill with respect to said hub to longitudinally move said quill with respect to said hub thereby adjusting the spacing between said knife and said extruder face.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated by carrying out the present invention:

FIG. 1 is a side sectional view with an apparatus embodying the present invention shown disposed in operational positioning at the front face of an extrusion die;

FIG. 2 is an end sectional view taken along the line 2—2 of FIG. 1;

FIG. 3 is a partial perspective view showing a portion of the device of the present invention; and FIG. 4 is a partial side sectional view on an enlarged scale showing in particular the manner in which the hub and quill are assembled.

DESCRIPTION OF THE INVENTION

Referring to the drawing and in particular FIG. 1 thereof, the construction of the extruder and cutting means with which the cutter adjustment means 10 of the present invention is adapted for cooperation is best shown as including a die 12 having a plurality of extrusion openings 14 circumferentially spaced about the face 16 of such a die and through which strands of thermoplastic resin material are adapted to be extruded. Thereafter, such strands are cut into discrete pellets by the action of rotating knives 18 passing across the face 16 of such die 12 at those points from which the strand emerges from the extrusion openings 14. The pellets may then pass into a cage structure 26 in which coolant fluid is circulated so as to cool, prevent the pellets from sticking to each other, and subsequently removing them for additional classification and packaging operations.

The knives 18 may be fixed in position relative to the face 16 of the die by means of a circular flange or ring 20 of a knife carrier 22 by means of bolts 24. The knife carrier 22 in turn may be provided with coolant introduction means 26 including a slinger 27 and is adapted for rotation about a generally stationary hollow cylindrical quill 28. The knife carrier 22 is supported upon the quill 28 by means of a plurality of bearings 30 suitably positioned therebetween by known retaining and locking devices such as the retainer 32 and the lock nut 34.

The quill 28 is supported upon a stationary hub 36 in a manner which will hereinafter be more fully explained. The hub 36 is generally cylindrical in shape and outwardly extends from the face of the die and is connected thereto by means of bolts 38 as by means of a connecting flange 40. Accordingly, the die 12, the hub 36, the quill 28 and coolant cage 26 are stationary with respect to the knife carrier 22 which in turn is adapted to rotate about the quill 28 so as to effect the above referrec to cutting action of the strands as they emerge from the extrusion openings 14. The hub is positioned generally centrally of the series of die openings which position, in addition to the radial center, may include a somewhat eccentric mounting with respect thereto so that the knives sweep across the die face eccentrically and accordingly utilize a greater length of blade surface in order to achieve longer wear.

The hub may be in part insulated from the extrusion die 12 as by the introduction of insulation 42 therebetween and may be further internally cooled by means of the introduction of a coolant to an interior bore 44 thereof by means of an inwardly extending conduit 46. Regardless of such attempts however to cool the hub, heat passing from the extrusion die and especially upon startup invariably passes to the hub 36 and the knife carrier 22 and causes a relative expansion therebetween with prior art adjustment systems where the quill is separated from the hub in those areas proximal to the heated die face. In such cases the heat from the die face, in order to equalize the temperature between the hub and knife carrier 22, must travel outwardly along the hub to a remote connection point and then return the full extent of the knife carrier thus making it difficult to immediately equalize any temperature expansion and often cause several adjustments to be caused prior to meeting steady state operations. Also, adjustment means remote from the heat source necessarily means that heat growth will be multiplied by the length of such hub and often may reach unacceptable magnitudes. The present invention eliminates such effects and furthermore assures that the quill and hub work as a unit by rotatably interconnecting such members by means of screw threads at a point proximal the front face of the die. Accordingly, not only do the quill and hub move together as a unit by such connection, but heat passes directly therethrough and more quickly achieves the temperatures present in steady state operation. Furthermore, the effective length of the hub at which temperature growth of the hub can effect the adjustment means is materially shortened and thus such effect minimized.

Turning again to the drawing and particularly FIG. 4 thereof, it may be seen that outwardly directed threads 48 are provided radially about the hub 36 and are in turn adapted to mesh with similar threads 50 provided at inner peripheral portions of the quill 28. These cooperative screw threads 48, 50 span a relatively short longitudinal extent along the hub 36 and the extent of threads 50 are flanked at either side thereof by a recess 52 in order to permit the quill 28 to longitudinally travel with respect to the hub 36 upon its relative adjustment rotation therewith and are prevented from inward over travel by means of the relative distance between the outer face of the die 12 and the ring 20 which is less than the space between the inner surface of threads 50 and a shoulder 53 so that metal to metal contact between ring 20 and the die will occur prior to the threads contacting the shoulder 53 so as to prevent damage to the threads 50. Also one or more land areas 54 in direct contact with the hub 36 and supported thereby may be provided for stability and support. The remaining interior portions of the quill 28 are recessed as at 56 in order that frictional contact between the quill 28 and hub 36 is relatively low so that the force required to overcome such is also relatively low and that the movement of the quill 28 with respect to the hub 36 can be easily accomplished by the adjustment means 66.

The adjustment means 66 includes an adapter 58 supportedly received about a hub extension 60 of reduced diameter projecting outwardly of the quill 28 at that end thereof remote from the die face. The adapter is in turn attached as by means of bolts 62 to a hub 64 of an adjustment wheel 66. The forward end of the adapter 58 is provided with a sun gear 68 in turn contacting a plurality of planet gears 70. In addition, the remote end of the quill 28 is provided with a ring gear 72 about the inner periphery thereof. The ring gear is in turn adapted to mesh with the planet gears 70. A lock nut 74 serves to secure the adjustment wheel 66 to the hub extension 60 by abutting contact with the hub 64 thereof and also places a load on threads 50 to prevent any possible backlash from thread machining inaccuracies and the like. The planet gears 70 are aligned between the ring gear 72 and the sun gear 68 by means of longitudinally extending shafts 76 disposed at one end thereof into the hub 36 and at the other end thereof into a bearing ring 78 which abuts the terminal portion of the quill 28 in bearing contact.

An indicator ring 80 having delineated marking and lock ring 82 are also provided. The bearing ring further includes a pointing element 84 so that the relative rotation of the quill with respect to the hub 36 and consequently the amount of longitudinal travel of the knives 18 with respect to the die face 16 may be observed from reference to the marking on the indicator ring 80. The relative relationship of such rings is retained by means of a positioning pin 77 in a known manner. Additionally a belt drive 86 having upwardly extending timing gears 88 is connected to the knife carrier 22 by any suitable means such as the bolts 90 shown and serves by means of a timing belt (not shown) to rotate the knife carrier with respect to the quill 28.

Accordingly it should be clear that rotational movement of the crank 66 causes rotation of the sun gear 68 which in turn rotates the planet gears 70 and in turn the ring gear 72. Such action enables the same adjustment rotation as transmitted to the adjusting wheel 66 to be translated to the quill 28 and accordingly cause such to move longitudinally in and out with respect to the hub 36. Heat transmitted by the extrusion die is accordingly more equally and more quickly distributed to those moving parts of the device which may affect the adjustment between the knives 18 and the extrusion face 16. Additionally, the quill 28 and the hub 36 are positively connected by means of the cooperating screw threads 48, 50 at a location proximal to the major heat source and accordingly enables the expansion caused by heat transmitted thereto to occur in tandem and accordingly their joint effects upon the knife spacing nullified. Also most of the heat growth or expansion that does take place within the hub, occurs to the right that is outward of the threaded connection between the hub and quill and therefore doesn't effect the adjustment of the knives with respect to the die face. Such hub growth outward of the threaded connection is taken up by permitting relative longitudinal movement between the planet gear 70 and the ring gear 72. Thus the hub may freely move relative to the quill 28 during periods of temperature equalization as upon startup and shut down.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An apparatus for cutting material strands as they emerge from a melt extruder having a plurality of extrusion openings generally radially extending about the fact thereof comprising a stationary cylindrical hub outwardly extending from said face, a hollow generally stationary quill positioned over and attached to said hub at a location proximal to said extruder face by means of a mutual thread engagement, a knife carrier rotatably supported on said quill, said knife carrier having at least one knife mounted thereon and adapted for opposed positioning with respect to said extruder face and in the path of said openings so as to cut materials as it emerges therefrom upon rotation about said quill, and quill adjusting means supported by said hub and positioned at that end of said hub distal from said extruder face for rotating said quill about said mutual thread engagement with said hub to longitudinally move said quill with respect to said hub thereby adjusting the longitudinal spacing between said knife and said extruder face.

2. The apparatus of claim 1, said hub positioned generally centrally of said openings.

3. The apparatus of claim 2, said hub projecting outwardly of said quill at said distal end thereof and forming a hub extension thereat, said quill adjusting means supported by said hub extension.

4. An apparatus for cutting material strands as they emerge from a melt extruder having a plurality of extrusion openings generally radially extending about the face thereof comprising a stationary cylindrical hub outwardly extending from said face, a hollow generally stationary quill positioned over and attached to said hub at a location proximal to said extruder face by means of a mutual thread engagement, a knife carrier rotatably supported on said quill, said knife carrier having at least one knife mounted thereon and adapted for opposed positioning with respect to said extruder face and in the path of said openings so as to cut material as it emerges therefrom upon rotation about said quill, quill adjusting means positioned at that end of said hub distal from said extruder face for threadably rotating said quill with respect to said hub to longitudinally move said quill with respect to said hub thereby adjusting the spacing between said knife and said extruder face, said hub positioned generally centrally of said openings, said quill adjusting means including a ring gear positioned about an inner periphery of said quill and having spaced planet gears engaged therewith and a sun gear rotatably supported about said hub whereby rotation of said sun gear in either direction threadably rotates said quill with respect to said hub in the same direction.

5. An apparatus for cutting material strands as they emerge from a melt extruder having a plurality of extrusion openings generally radially extending about the face thereof comprising a stationary cylindrical hub outwardly extending from said face, a hollow generally stationary quill positioned over and attached to said hub at a location proximal to said extruder face by means of a mutual thread engagement, a knife carrier rotatably supported on said quill, said knife carrier having at least one knife mounted thereon and adapted for opposed positioning with respect to said extruder face and in the path of said openings so as to cut material as it emerges therefrom upon rotation about said quill, quill adjusting means positioned at that end of said hub distal from said extruder face for threadably rotating said quill with respect to said hub to longitudinally move said quill with respect to said hub thereby adjusting the spacing between said knife and said extruder face, said hub positioned generally centrally of said openings, said hub projecting outwardly of said quill at said distal end thereof and forming a hub extension thereat, said quill adjusting means supported by said hub extension, said quill adjusting means including a ring gear positioned about an inner periphery of said quill and having spaced planet gears engaged therewith and a sun gear rotatably supported about said hub extension whereby rotation of said sun gear in either direction threadably rotates said quill with respect to said hub in the same direction.

6. The apparatus of claim 5, said sun gear including an outwardly projecting extension in turn connected to the central hub of a hand wheel, said hand wheel supported by said hub extension for adjustment rotation thereabout.

7. The apparatus of claim 5, said planet gears and said ring gear being adapted for relatively longitudinal movement with respect to each other.

UNITED STATES PATENT OFFICE
CERTIFICATE OF CORRECTION

Patent No. 4,184,833                Dated January 22, 1980

Inventor(s) BUCHAN, Walter; KROPA, Gomer E and WINIARSKI, Edward J.

It is certified that error appears in the above-identified patent and that said Letters Patent are hereby corrected as shown below:

Column 5, line 8, (claim 1, line 4) change "fact" to --face--

Signed and Sealed this

Twenty-ninth Day of April 1980

[SEAL]

Attest:

SIDNEY A. DIAMOND

Attesting Officer        Commissioner of Patents and Trademarks